(12) United States Patent
Ueki

(10) Patent No.: US 7,466,427 B2
(45) Date of Patent: Dec. 16, 2008

(54) VIBRATION-RESISTANT INTERFEROMETER APPARATUS

(75) Inventor: Nokuaki Ueki, Saitama (JP)

(73) Assignee: Fujinon Corporation, Saitama (JP)

(*) Notice: Subject to any disclaimer, the term of this patent is extended or adjusted under 35 U.S.C. 154(b) by 56 days.

(21) Appl. No.: 11/634,897

(22) Filed: Dec. 7, 2006

(65) Prior Publication Data
US 2007/0146724 A1 Jun. 28, 2007

Related U.S. Application Data

(63) Continuation-in-part of application No. 10/902,389, filed on Jul. 30, 2004, now abandoned.

(30) Foreign Application Priority Data
Aug. 13, 2003 (JP) ............... 2003-292965

(51) Int. Cl.
*G01B 11/02* (2006.01)
(52) U.S. Cl. .................................... 356/497
(58) Field of Classification Search .......... 356/496, 356/497, 511, 512, 513, 514
See application file for complete search history.

(56) References Cited

U.S. PATENT DOCUMENTS

| 5,557,408 A | 9/1996 | Kanaya |
| 5,751,427 A | 5/1998 | de Groot |
| 5,999,263 A | 12/1999 | Deck et al. |
| 6,621,579 B2 | 9/2003 | Ge |
| 6,813,029 B1 | 11/2004 | Lindner |

FOREIGN PATENT DOCUMENTS

| JP | HEI08-114412 | 5/1996 |
| JP | HEI08-219738 | 8/1996 |
| JP | HEI09-21606 | 1/1997 |

OTHER PUBLICATIONS

Hotate, Kazuo et al., "Photonic Sensing by Synthesis of Coherence Function",*Proceedings of 15th Meeting on Lightwave Sensing Technology*, May 1995, pp. 75-82.

*Primary Examiner*—Michael A Lyons
(74) *Attorney, Agent, or Firm*—Birch, Stewart, Kolasch & Birch, LLP

(57) ABSTRACT

A half mirror 4 divides a luminous flux emitted from a low-coherence light source 1 into two luminous fluxes, a secondary reference plate 6 is held integrally with a reference plate 16, and a secondary sample 8 is held integrally with a sample 17. A first luminous flux which is obtained through dividing by the half mirror 4 is reflected at a mirror 5 and which reaches a secondary reference surface 6a, is reflected at the secondary reference surface 6a, returns along the same optical path, and is transmitted through the half mirror 4. The second luminous flux reaches a secondary sample surface 8a, is reflected at the secondary sample surface 8a, returns along the same optical path, and is combined with the first luminous flux at the half mirror 4. The optical path length difference between the first luminous flux and the second luminous flux coincides with approximately twice the optical distance between a reference surface 16a and a sample surface 17a.

16 Claims, 8 Drawing Sheets

VIBRATION-RESISTANT INTERFEROMETER APPARATUS

RELATED APPLICATIONS

This application is a continuation-in-part of U.S. patent application Ser. No. 10/902,389, filed Jul. 30, 2004, now abandoned and claims the priority of Japanese Patent Application No. 2003-292965 filed on Aug. 13, 2003. These two applications are incorporated herein by reference.

BACKGROUND OF THE INVENTION

1. Field of the Invention

The present invention relates to an interferometer in which, to carry out interferometry on the surface form or the like of any of various samples using a light source having a short coherence length such as a light emitting diode (LED), a super luminescent diode (SLD), a halogen lamp or the like, a luminous flux emitted from the light source is divided into two luminous fluxes, one of these two luminous fluxes is detoured by a prescribed optical path length relative to the other one, and then the two luminous fluxes are again combined to form an irradiating luminous flux, and in particular relates to a vibration-resistant interferometer apparatus for which the influence on the interferometry of relative movement between a reference surface of the interferometer and the sample surface is reduced.

2. Description of the Prior Art

Conventionally, Fizeau-type interferometers equipped with a light source having a long coherence length such as a laser light source have been widely used as easy-to-use interferometers, this being because a gap corresponding to the coherence length of the light source used can be provided between the reference surface and the sample surface, and hence sufficient workspace can be secured.

However, in general laser light sources are expensive and large in size, which inevitably leads to an increase in the cost and the size of the interferometer apparatus.

Moreover, in the case of carrying out measurements/analysis on a sample having a non-sample surface approximately parallel to the sample surface such as a plane parallel glass sheet (here, the non-sample surface of the sample is the surface on the opposite side to the sample surface), because the coherence length of the light source used is long, along with optical interference from the reference surface and the sample surface, optical interference from the reference surface and the non-sample surface and optical interference from the sample surface and the non-sample surface also arise. In general, interference fringes other than those arising through the optical interference from the reference surface and the sample surface thus become noise, and hence it becomes difficult to measure the form of the sample surface with high precision.

As art for resolving this problem with a Fizeau-type interferometer, the present applicants have already disclosed a path-matching passage type interferometer apparatus as described in Japanese Unexamined Patent Publication No. HEI 9-21606. According to this path-matching passage type interferometer apparatus, a luminous flux emitted from a light source is divided into two luminous fluxes, these two luminous fluxes are made to separately pass along two optical paths having different optical path lengths to one another, and then the two luminous fluxes are again combined, and moreover the optical path length difference between the optical path length for reflected light obtained through reflection from the sample surface of the luminous flux that has passed along the optical path having the shorter optical path length and the optical path length for reflected light obtained through reflection from the reference surface of the luminous flux that has passed along the optical path having the longer optical path length is made to be within the coherence length of the light source, and hence these two reflected lights are made to optically interfere with one another, whereby even if a light source having a short coherence length is used, sufficient workspace can be secured between the reference surface and the sample surface through the way of setting the optical path lengths of the two optical paths, and hence reductions in the cost and the size of the interferometer apparatus can be achieved with no loss of ease of use.

Moreover, by setting the coherence length of the luminous flux emitted from the light source to be less than a prescribed length, it can be made such that interference fringes do not arise for any cases except the case due to the reflected light obtained through reflection from the sample surface of the luminous flux that has passed along the optical path having the shorter optical path length and the reflected light obtained through reflection from the reference surface of the luminous flux that has passed along the optical path having the longer optical path length, and hence it becomes possible to obtain a clear interference fringe image with no noise through a very simple constitution.

Moving on, regarding measurement of the form of a sample surface using an interferometer apparatus, in general comparative measurement relative to a reference surface possessed by the interferometer apparatus is carried out on the sample surface which is held by a holding apparatus. The reflected light wavefront from the reference surface and the reflected light wavefront from the sample surface are combined, and the form of the sample surface relative to the reference surface is measured/analyzed from interference fringes produced due to the phase difference between the two wavefronts.

In other words, if the relative positional relationship between the reference surface and the sample surface subjected to the comparative measurement is not fixed during the measurement, then the phase difference between the two wavefronts will change, and in accordance with this the interference fringes will change and hence it will not be possible to carry out precise measurement of the form. In particular, in the case of using a light source having a very short coherence length as the light source, for example a halogen lamp (coherence length=1 µm), if the relative distance between the reference surface and the sample surface changes even slightly (by 0.5 µm in the case of a halogen lamp), the range of the coherence length will be missed and hence interference fringes will no longer be produced.

Consequently, conventionally, in general the main body of the interferometer, the holding means for the reference surface and the main body of the interferometer, and the holding apparatus for the sample surface are all robustly constituted, and moreover the interferometer apparatus holding the reference surface and the holding apparatus for the sample surface are integrated together with a robust construction, and hence changes in the relative position between the reference surface and the sample surface during measurement are suppressed, and moreover the whole of the measurement system is installed in a high-performance vibration-proof apparatus so that the various elements that maintain the relative positional relationship between the reference surface and the sample surface will not be subjected to external forces due to vibrations that would cause a change in the relative positional relationship.

However, it is not possible to use a vibration-proof apparatus in in-process (on-machine) measurement such as interferometry carried out on the processed surface during the processing when processing a metal mirror using a machine tool.

Moreover, to carry out actual interferometry, various moving apparatuses and fine adjustment mechanisms for aligning the reference surface and the sample surface in prescribed positions are required, and it is difficult to make these have a sufficiently robust construction that stable measurement can be carried out without a vibration-proof apparatus.

Moreover, thermal changes in the measurement system due to temperature changes in the measurement environment are unavoidable. In particular, with a large measurement system, the influence of the thermal expansion coefficient of the materials used becomes large.

Consequently, even when measures to maintain the relative positional relationship between the reference surface and the sample surface as described above have been taken, it has been very difficult to perfectly maintain this relative positional relationship. An interferometer apparatus for which changes during measurement in the interference fringes arising through optical interference between the reflected light wavefront from the reference surface and the reflected light wavefront from the sample surface can be suppressed through a simpler constitution has thus been eagerly awaited.

SUMMARY OF THE INVENTION

The present invention has been devised in view of the circumstances described above; it is an object of the present invention to provide a vibration-resistant interferometer apparatus for which the holding means for the reference surface and the main body of the interferometer, and for which the holding apparatus for the sample surface and the interferometer apparatus holding the reference surface, and so on are not made to be mechanically robust, but rather even if the relative positional relationship between the reference surface and the sample surface changes, changes during measurement in the interference fringes arising through optical interference between the reflected light wavefront from the reference surface and the reflected light wavefront from the sample surface can be suppressed optically.

A vibration-resistant interferometer apparatus of the present invention for attaining the above object is a light wave interferometer apparatus in which a luminous flux emitted from a light source is divided into two luminous fluxes by luminous flux dividing means, one of the two luminous fluxes is detoured by a prescribed optical path length relative to the other one, and then the two luminous fluxes are recombined into one luminous flux to form an irradiating luminous flux, and interference fringes produced through optical interference between a luminous flux obtained through the irradiating luminous flux being reflected at a reference surface and a luminous flux obtained through the irradiating luminous flux being transmitted through the reference surface and then reflected at a sample surface are obtained; wherein the light source is a low-coherence light source for which the luminous flux emitted from the light source has a coherence length shorter than twice the optical distance between the reference surface and the sample surface, or a wavelength-modulated light source adjusted such that the coherence length is equivalent to the coherence length possessed by such a low-coherence light source when an image of the interference fringes is captured by an imaging element; wherein the irradiating luminous flux is obtained by reflecting a first luminous flux out of the two luminous fluxes via the reference surface or a secondary reference surface that is held such that the relative positional relationship thereof with the reference surface does not change, and reflecting a second luminous flux out of the two luminous fluxes via the sample surface or a secondary sample surface that is held such that the relative positional relationship thereof with the sample surface does not change and faces in the same direction as the sample surface, and then recombining the first luminous flux and the second luminous flux into the one luminous flux such that the axis of the first luminous flux and the axis of the second luminous flux substantially coincide with one another; and wherein the prescribed optical path length coincides with approximately twice the optical distance between the reference surface and the sample surface within the range of the coherence length of the luminous flux emitted from the light source.

In the present invention, a constitution may be adopted in which the luminous flux dividing means is the reference surface or the secondary reference surface, a luminous flux reflected at the reference surface or the secondary reference surface is taken as the first luminous flux, a luminous flux transmitted through the reference surface or the secondary reference surface, reflected at the sample surface or the secondary sample surface, and then transmitted through the reference surface or the secondary reference surface is taken as the second luminous flux, and the first luminous flux and the second luminous flux are recombined into the one luminous flux at the reference surface or the secondary reference surface to form the irradiating luminous flux.

Alternatively, a constitution may be adopted in which the luminous flux dividing means is a beam splitter, one of the two luminous fluxes obtained through the dividing by the beam splitter is irradiated onto the reference surface or the secondary reference surface and the reflected luminous flux is taken as the first luminous flux, the other one of the two luminous fluxes is irradiated onto the sample surface or the secondary sample surface and the reflected luminous flux is taken as the second luminous flux, and the first luminous flux and the second luminous flux are recombined into the one luminous flux at the beam splitter to form the irradiating luminous flux.

Moreover, it may be made to be such that a reflecting surface that reflects the luminous flux emitted from the light source is disposed on a side of the reference surface, from which the irradiating luminous flux is incident, the luminous flux is irradiated substantially perpendicularly onto the reference surface and the sample surface via the reflecting surface, and the first luminous flux which has been reflected at the reference surface and the second luminous flux which has been transmitted through the reference surface and then reflected at the sample surface are combined at the position of the reference surface to form the irradiating luminous flux.

Moreover, it may be made to be such that the secondary reference surface is disposed substantially in the same plane as the reference surface, and/or the secondary sample surface is disposed substantially in the same plane as the sample surface.

Moreover, it may be made to be such that the secondary reference surface and/or the secondary sample surface has optical path length adjustment means for moving the secondary reference surface and/or the secondary sample surface in a direction along the axis of the incident luminous flux, and optical axis adjustment means for adjusting the inclination of the axis of the reflected luminous flux relative to the axis of the incident luminous flux.

Moreover, it may be made to be such that the secondary reference surface or the secondary sample surface can be moved by a piezoelectric element.

Moreover, it may be made to be such that the prescribed optical path length substantially equals twice the optical distance between the reference surface and the sample surface.

Moreover, it may be made to be such that the vibration-resistant interferometer apparatus further has light amount changing means for at least one of the two luminous fluxes.

Moreover, it may be made to be such that the luminous flux emitted from the light source is linearly polarized light having a prescribed oscillation plane, or is made to be linearly polarized light having a prescribed oscillation plane by being transmitted through a prescribed polarizing element.

In the present invention, it may be made to be such that a sample having the sample surface is a transparent thin sheet, and the coherence length of the luminous flux emitted from the light source is set to be shorter than twice the optical distance of the thickness of the transparent thin sheet.

Alternatively, a constitution may be adopted in which the sample surface is a reference reflecting mirror surface, a light-transmitting sample transmitting object is disposed between the reference surface and the reference reflecting mirror surface, the irradiating luminous flux and a luminous flux obtained through reflection of the irradiating luminous flux by the reference reflecting mirror surface are transmitted through the sample transmitting object, and phase distribution measurement is carried out on the sample transmitting object.

Moreover, a constitution may be adopted in which a condensing lens is disposed in the second luminous flux, and the condensing point of the second luminous flux by the condensing lens is positioned on the sample surface.

In the present invention, the low-coherence light source may be a light emitting diode, a super luminescent diode, or a halogen lamp.

Further, a hole may be formed in a central portion of the sample surface, and the secondary sample surface may be disposed inside the hole.

Moreover, the transparent thin sheet may be a film.

DESCRIPTION OF THE PREFERRED EMBODIMENTS

Following is a description of embodiments of the present invention with reference to the drawings.

First Embodiment

Figure 1:
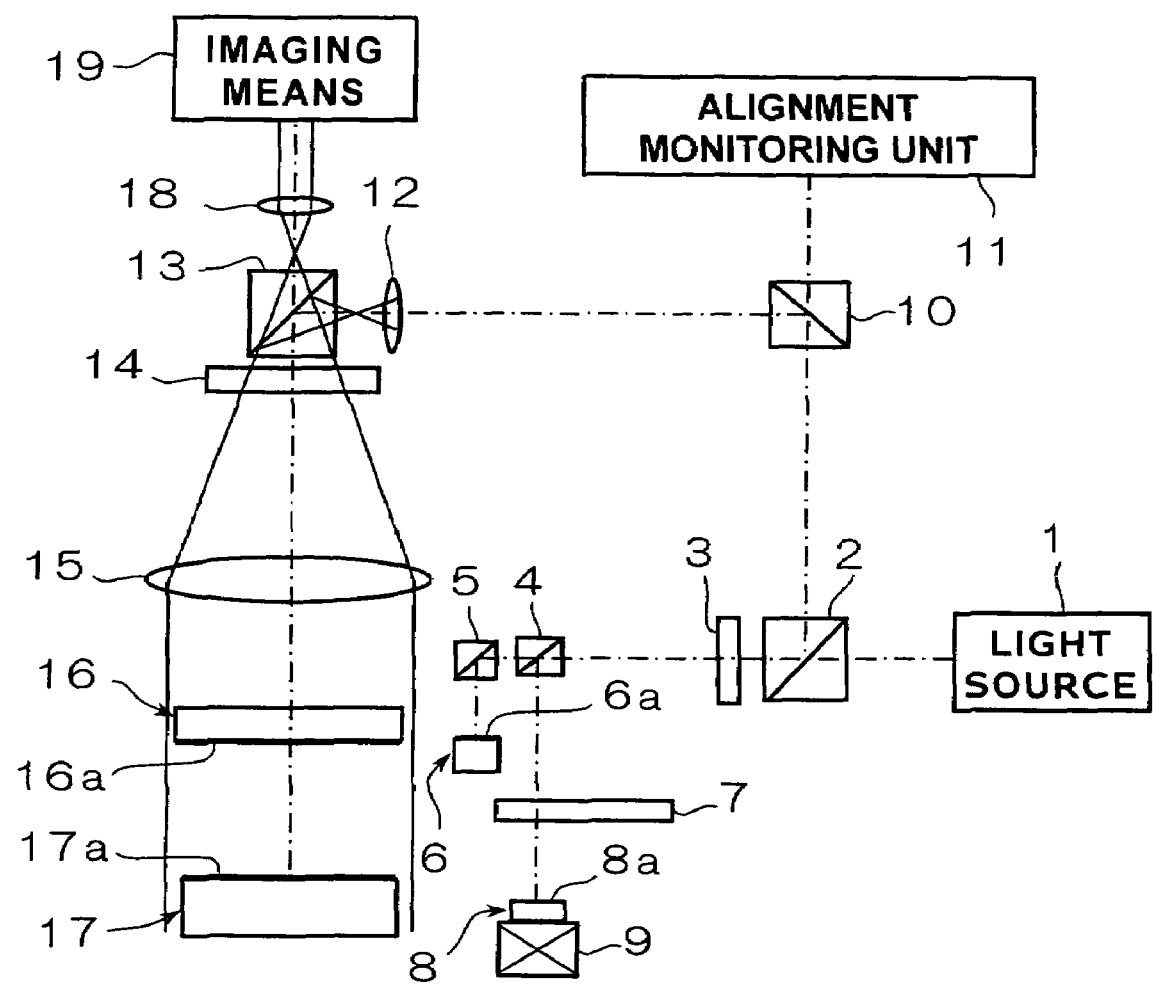
FIG. 1 is a schematic optical path diagram of a vibration-resistant interferometer apparatus according to a first embodiment of the present invention.

FIG. 1 is a schematic optical path diagram of a vibration-resistant interferometer apparatus according to a first embodiment of the present invention. The vibration-resistant interferometer apparatus according to the first embodiment shown in FIG. 1 (hereinafter sometimes referred to as the 'apparatus of the first embodiment') is a Fizeau-type light wave interferometer apparatus that obtains interference fringes produced through optical interference between a luminous flux obtained through an irradiating luminous flux being reflected at a reference surface 16a and a luminous flux obtained through the irradiating luminous flux being transmitted through the reference surface 16a and then reflected at a sample surface 17a, and comprises a light source 1 that emits a luminous flux having a coherence length shorter than twice the optical distance between the reference surface 16a and the sample surface 17a, a half mirror (beam splitter) 4 as luminous flux dividing means for dividing the luminous flux emitted from the light source 1 into two luminous fluxes, a secondary reference plate 6 that is held integrally with a reference plate 16, and a secondary sample 8 that is held integrally with a sample 17.

As the light source 1, a low-coherence light source having a short coherence length such as an LED, an SLD or a halogen lamp, or a wavelength-modulated light source adjusted such that the coherence length is equivalent to the coherence length possessed by such a low-coherence light source when an image of the interference fringes is captured by the imaging element of an imaging means 19 can be used. Such a wavelength-modulated light source is a light source for which, during a time period shorter than the response time period of the imaging element (the light accumulation time period), the wavelength of the light emitted from the light source (in general a semiconductor laser light source is used) is modulated, and the interference fringes are captured in time-averaged fashion over the response time period of the imaging element, whereby results equivalent to in the case of using a light source that emits light having a broad spectral width and a short coherence length are obtained; for example, a technique of synthesizing coherence functions is shown on pages 75 to 82 of Proceedings of Meeting on Lightwave Sensing Technology, May 1995. Moreover, art in which this technique is improved has been invented by the present applicant.

A secondary reference surface holding apparatus (omitted from the drawing) that holds the secondary reference plate 6 comprises, for example, a holder that holds the secondary reference plate 6 integrally with the reference plate 16, and is constituted such as to be able to hold the secondary reference plate 6 such that a secondary reference surface 6a of the secondary reference plate 6 is positioned substantially in the same plane as the reference surface 16a, and the relative positional relationship of the secondary reference surface 6a with the reference surface 16a does not change. A secondary sample surface holding apparatus (omitted from the drawing) that holds the secondary sample 8 comprises, for example, a holder that holds the secondary sample 8 integrally with the sample 17, and is constituted such as to be able to hold the secondary sample 8 such that a secondary sample surface 8a of the secondary sample 8 faces in the same direction as the sample surface 17a and the relative positional relationship of the secondary sample surface 8a with the sample surface 17a does not change.

With this apparatus of the first embodiment, the apparatus is constituted such that the luminous flux emitted from the light source 1 is linearly polarized light having a prescribed oscillation plane, or is made to be linearly polarized light having a prescribed oscillation plane by being transmitted through a prescribed polarizing element, and moreover one of the two luminous fluxes obtained through the division by the half mirror 4 is irradiated onto the secondary reference surface 6a and the reflected luminous flux is taken as a first luminous flux, the other one of the two luminous fluxes is irradiated onto the secondary sample surface 8a and the reflected luminous flux is taken as a second luminous flux, and these first and second luminous fluxes are recombined into one luminous flux at the half mirror 4 to form the irradiating luminous flux. Moreover, the secondary sample 8 is disposed on a piezoelectric element 9, with the constitution being such that the secondary sample surface 8a can be moved in the up/down direction in the drawing by the piezoelectric element 9, and light amount changing means 7 is provided in the path from the half mirror 4 to the secondary sample surface 8a.

That is, the linearly polarized luminous flux emitted from the light source 1 is transmitted through a polarization beam splitter 2 and a quarter wave plate 3 disposed between the light source 1 and the half mirror 4, and is converted into circularly polarized light by the quarter wave plate 3 before reaching the half mirror 4. A first luminous flux of the circularly polarized light transmitted through the half mirror 4 is reflected at a mirror 5 and reaches the secondary reference surface 6a, is reflected at the secondary reference surface 6a and returns along the same optical path, and is again reflected at the mirror 5 and transmitted through the half mirror 4.

On the other hand, a second luminous flux of the circularly polarized light that has been reflected at the half-mirrored surface upon reaching the half mirror 4 is transmitted through the light amount changing means 7 and reaches the secondary sample surface 8a, is reflected at the secondary sample surface 8a and returns along the same optical path, is transmitted through the light amount changing means 7 and reflected at the half-mirrored surface of the half mirror 4, and is combined with the first luminous flux to form the irradiating luminous flux. Note that here the position of the secondary sample surface 8a is set such that the optical path length difference between the two paths from being divided at the half mirror 4 up to being recombined at the half mirror 4 separately traveled by the first and second luminous fluxes is twice the optical path length between the reference surface 16a and the sample surface 17a. That is, optical path length adjustment means (omitted from the drawing) such as a moving stage that is capable of adjusting the position of the secondary sample surface 8a in the direction of the optical axis is provided on the secondary sample 8, and it is such that the position of the secondary sample surface 8a can be set using this optical path length adjustment means. Note that alternatively such optical path length adjustment means may be provided on the secondary reference plate 6, so that the position of the secondary reference surface 6a in the direction of the optical axis can be adjusted.

The circularly polarized irradiating luminous flux obtained by combining the first and second luminous fluxes is converted at the quarter wave plate 3 into linearly polarized light having an oscillation plane orthogonal to that when emitted from the light source 1, and is reflected by the polarization beam splitter 2 and is incident on a half mirror 10. The linearly polarized light incident on the half mirror 10 is divided at the half-mirrored surface of the half mirror 10 into light that is transmitted through the half mirror 10 and is incident on an alignment monitoring unit 11, and light that is reflected through 90° at the half mirror 10 and is incident on a magnifying lens 12.

The linearly polarized light that has been transmitted through the half mirror 10 and reached the alignment monitoring unit 11 is used for combining the first luminous flux reflected at the secondary reference surface 6a and the second luminous flux reflected at the secondary sample surface 8a in a state in which the axes of the first and second luminous fluxes precisely coincide with one another. That is, at least one of the secondary reference plate 6 and the secondary sample 8 is equipped with optical axis adjustment means (omitted from the drawing) such as an axis-adjusting stage that is capable of adjusting the inclination of the optical axis of the reflected luminous flux relative to the luminous flux incident on the secondary reference plate 6 or the secondary sample 8; it is such that while the positions of the axes of the first and second luminous fluxes are being checked by the alignment monitoring unit 11, these axes can be adjusted such as to precisely coincide with one another using the optical axis adjustment means.

On the other hand, the linearly polarized light reflected at the half mirror 10 is diverged by the magnifying lens 12 and reaches a polarization beam splitter 13, is reflected at the polarization beam splitter 13 and is incident on a quarter wave plate 14, is converted into a circularly polarized luminous flux by the quarter wave plate 14 and reaches a collimator lens 15, and is made into parallel light by the collimator lens 15.

The circularly polarized luminous flux that has been made into parallel light is incident on the reference plate 16, and part thereof is reflected at the reference surface 16a (out of the previously mentioned first luminous flux, the luminous flux reflected at the reference surface 16a shall be referred to as luminous flux 1Rr, and out of the previously mentioned second luminous flux, the luminous flux reflected at the reference surface 16a shall be referred to as luminous flux 2Rr), and the remainder is transmitted through the reference surface 16a and reaches the sample surface 17a of the sample 17, and is reflected at the sample surface 17a (out of the previously mentioned first luminous flux, the luminous flux that is transmitted through the reference surface 16a and reflected at the sample surface 17a shall be referred to as luminous flux 1Sr, and out of the previously mentioned second luminous flux, the luminous flux that is transmitted through the reference surface 16a and reflected at the sample surface 17a shall be referred to as luminous flux 2Sr) before returning along the same path, being transmitted through the reference surface 16a, and being combined with the light that is reflected at the reference surface 16a.

The combined circularly polarized light is incident on the quarter wave plate 14 while being condensed by the collimator lens 15, and is converted into linearly polarized light having an oscillation plane orthogonal to that when incident on the quarter wave plate 14 while being diverged by the magnifying lens 12. This linearly polarized light is transmitted through the polarization beam splitter 13, and an image of the sample surface 17a is formed on an imaging element of imaging means (a CCD camera) 19 by a photographic lens 18.

With the apparatus of the first embodiment, the relationship for the formation of interference fringes is determined by the optical path lengths from the light (luminous flux) incident on the half mirror 4 being divided into the two luminous fluxes at the half-mirrored surface thereof up to the luminous fluxes being combined at the reference surface 16a of the reference plate 16. The paths of the luminous fluxes in terms of the reference numerals of the optical elements passed are as follows.

Luminous flux 1Rr
  4-5-6$a$-5-4-3-2-10-12-13-14-15-16$a$

Luminous flux 1Sr
  4-5-6$a$-5-4-3-2-10-12-13-14-15-16$a$-17$a$-16$a$ Luminous flux 2Rr
  4-7-8$a$-7-4-3-2-10-12-13-14-15-16$a$ Luminous flux 2Sr
  4-7-8$a$-7-4-3-2-10-12-13-14-15-16$a$-17$a$-16$a$ Here, taking the optical path length of the path 4-3-2-10-12-13-14-15-16$a$ which is common to the four luminous fluxes to be L, and taking the optical path length of the path 4-5-6$a$-5-4 to be $L_1$, the optical path length of the path 4-7-8$a$-7-4 to be $L_2$, and the optical path length of the path 16$a$-17$a$-16$a$ to be $L_3$, the optical path lengths for the four luminous fluxes that follow the different paths described above can be expressed as follows.

Optical path length for luminous flux 1Rr ($OP_1$)

$$OP_1 = L_1 + L$$

Optical path length for luminous flux 1Sr ($OP_2$)

$$OP_2 = L_1 + L + L_3$$

Optical path length for luminous flux 2Rr ($OP_3$)

$$OP_3 = L_2 + L$$

Optical path length for luminous flux 2Sr ($OP_4$)

$$OP_4 = L_2 + L + L_3$$

Now, with this apparatus of the first embodiment, dividing into two paths is carried out at the half mirror 4, and the position of the secondary sample surface 8$a$ is set such that the optical path length difference between the two paths up to the recombination at the half mirror 4 after the reflection at the secondary reference surface 6$a$ or the secondary sample surface 8$a$ is twice the optical path length between the reference surface 16$a$ and the sample surface 17$a$; the following relationship thus holds:

$$L_2 - L_1 = L_3$$

Substituting this relationship into the above expressions for the optical path lengths gives:

$$OP_1 = L_1 + L$$

$$OP_2 = L_1 + L + L_3$$

$$OP_3 = L_2 + L = L_1 + L + L_3$$

$$OP_4 = L_2 + L + L_3 = L_1 + L + 2L_3$$

Consequently, $OP_2 = OP_3$, and hence the optical path length is equal for the luminous fluxes traveling these two paths, and thus interference will occur even in the case of using a light source 1 that emits a luminous flux having a coherence length shorter than twice the optical path length between the reference surface 16$a$ and the sample surface 17$a$ ($L_3$). On the other hand, the optical path length difference between any other two of the paths will be greater than twice the optical path length between the reference surface 16$a$ and the sample surface 17$a$ ($L_3$), and hence interference will not occur.

Moreover, even if one considers the case that, under the influence of external vibration or the like, the reference surface 16$a$ moves by $\Delta a$ in the direction of the optical axis, and the sample surface 17$a$ moves by $\Delta b$ in the direction of the optical axis, because the secondary reference plate 6 and the reference plate 16 are supported integrally with one another, and the secondary sample 8 and the sample 17 are supported integrally with one another, the relationship $OP_2 = OP_3$ will not be lost. The relationship in this case becomes as follows:

$$OP_2 = (L_1 + 2\Delta a) + (L + \Delta a) + (L_3 + 2\Delta a + 2\Delta b)$$

$$OP_3 = (L_2 + 2\Delta b) + (L + \Delta a)$$

Moreover, because the secondary reference plate 6 and the reference plate 16 are supported integrally with one another, and the secondary sample 8 and the sample 17 are supported integrally with one another:

$$(L_2 + 2\Delta b) - (L_1 + 2\Delta a) = (L_3 + 2\Delta a + 2\Delta b)$$

and hence $$L_2 = L_1 + L_3 + 4\Delta a$$

and thus calculating the optical path length difference between $OP_2$ and $OP_3$:

$$OP_2 - OP_3 = L_1 - L_2 + L_3 + 4\Delta a = L_1 - (L_1 + L_3 + 4\Delta a) + L_3 + 4\Delta a = 0$$

That is, even if the reference surface 16$a$ and the sample surface 17$a$ each move in the direction of the optical axis with no relationship therebetween through the influence of vibration or the like, no optical path length difference between the two paths that contribute to interference will arise, and no phase difference will arise between the two interfering luminous fluxes. Changes in the interference fringes will thus not arise, and hence precise interferometry is possible. Moreover, by driving the piezoelectric element 9 supporting the secondary sample 8, and hence minutely displacing the position of the secondary sample surface 8$a$ in the up/down direction in the diagram, fringe scanning measurement or the like can also be carried out.

Second Embodiment

Figure 2:
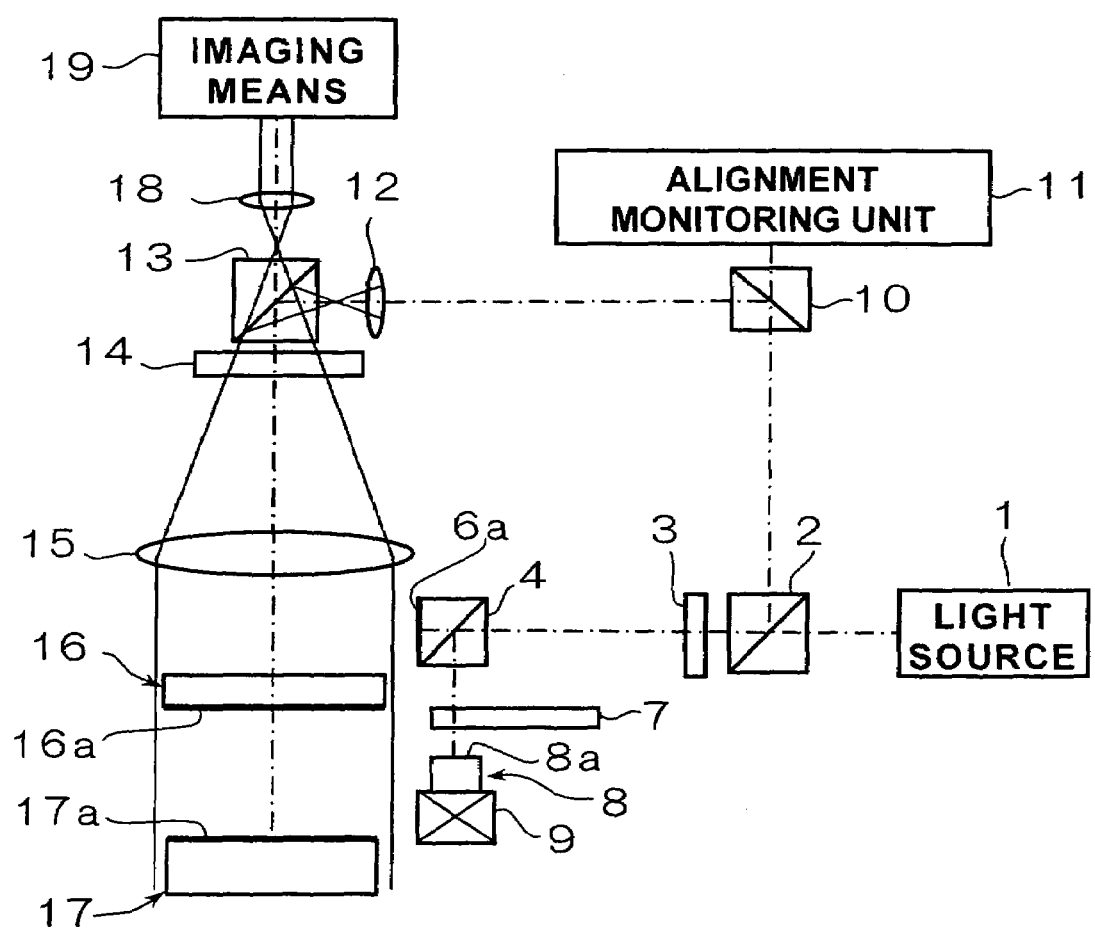
FIG. 2 is a schematic optical path diagram of a vibration-resistant interferometer apparatus according to a second embodiment of the present invention.

Next, a vibration-resistant interferometer apparatus according to a second embodiment of the present invention (hereinafter sometimes referred to as the 'apparatus of the second embodiment') will be described with reference to the drawings. FIG. 2 is a schematic optical path diagram of the vibration-resistant interferometer apparatus according to the second embodiment of the present invention. Note that out of the various optical elements in the apparatus of the second embodiment shown in FIG. 2, ones the same as ones in the apparatus of the first embodiment described earlier are given the same reference numerals as in FIG. 1, and detailed description thereof will be omitted here. This also applies to the other embodiments described later.

The apparatus of the second embodiment shown in FIG. 2 differs to the apparatus of the first embodiment described earlier in that the secondary reference surface 6$a$ is provided integrally with the half mirror 4 on a left side surface thereof in the diagram. That is, the linearly polarized luminous flux emitted from the light source 1 is transmitted through the polarization beam splitter 2 and the quarter wave plate 3, and is converted into circularly polarized light by the quarter wave plate 3 before reaching the half mirror 4. A first luminous flux of the circularly polarized light transmitted through the half-mirrored surface of the half mirror 4 reaches the secondary reference surface 6$a$, is reflected at the secondary reference surface 6$a$ and returns along the same optical path, and is again transmitted through the half-mirrored surface.

On the other hand, a second luminous flux of the circularly polarized light that has been reflected at the half-mirrored surface upon reaching the half mirror 4 is transmitted through the light amount changing means 7 and reaches the secondary sample surface 8a, is reflected at the secondary sample surface 8a and returns along the same optical path, is transmitted through the light amount changing means 7 and reflected at the half-mirrored surface of the half mirror 4, and is combined with first luminous flux to form an irradiating luminous flux. Note that the point that here the position of the secondary sample surface 8a is set such that the optical path length difference between the two paths from being divided at the half-mirrored surface up to being recombined at the half-mirrored surface separately traveled by the first and second luminous fluxes is twice the optical path length between the reference surface 16a and the sample surface 17a, and also the paths traveled after the first and second luminous fluxes have been combined into the irradiating luminous flux, and so on are as with the apparatus of the first embodiment described earlier.

According to the apparatus of the second embodiment, the secondary reference surface 6a is provided integrally with the half mirror 4 on the above-mentioned side surface thereof, and hence the mirror 5 and the secondary reference plate 6 in the apparatus of the first embodiment become unnecessary, and thus by closing up the space in question the apparatus can be made more compact. Moreover, by driving the piezoelectric element 9 supporting the secondary sample 8, and hence minutely displacing the position of the secondary sample surface 8a in the up/down direction in the diagram, fringe scanning measurement or the like can also be carried out.

Note, however, that in the case of the apparatus of the second embodiment, the directions of the normals to the secondary reference surface 6a and the reference surface 16a are orthogonal to one another, and hence in response to movement of the reference surface 16a in the direction of the optical axis the secondary reference surface 6a will only move orthogonal to this optical axis, and thus movement (vibration) of the reference surface 16a relative to the main body of the interferometer cannot be canceled out. The main body of the interferometer apparatus and the reference plate must thus be constituted integrally with one another. However, the effect of influence due to movement (vibration) of the sample being mitigated is produced.

Third Embodiment

Figure 3:
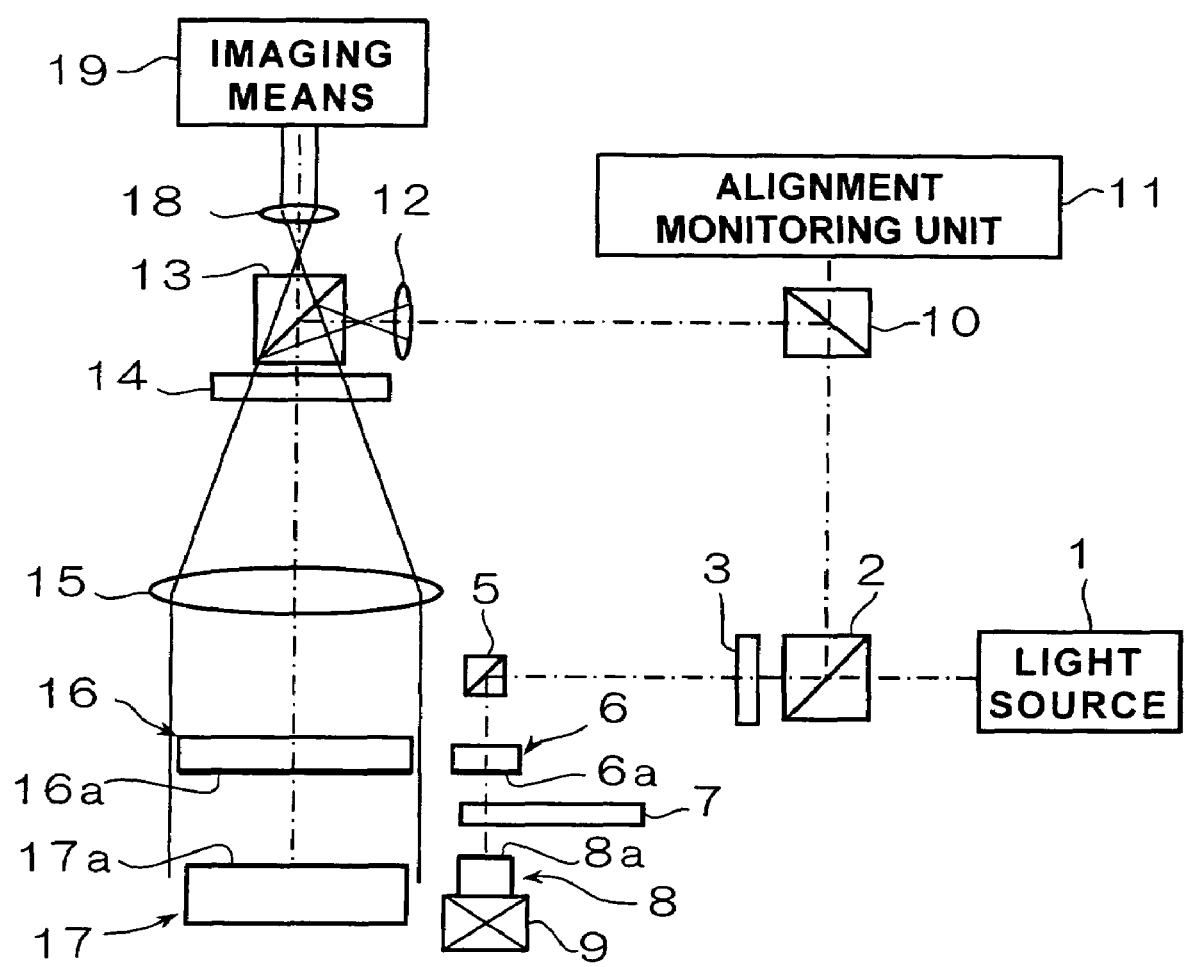
FIG. 3 is a schematic optical path diagram of a vibration-resistant interferometer apparatus according to a third embodiment of the present invention.

Next, a vibration-resistant interferometer apparatus according to a third embodiment of the present invention (hereinafter sometimes referred to as the 'apparatus of the third embodiment') will be described with reference to the drawings. FIG. 3 is a schematic optical path diagram of the vibration-resistant interferometer apparatus according to the third embodiment of the present invention.

The apparatus of the third embodiment shown in FIG. 3 differs to the apparatuses of the first and second embodiments described earlier in that the secondary reference surface 6a is disposed in the path from the mirror 5 to the secondary sample surface 8a such as to face in the same direction as the reference surface 16a and to be positioned substantially in the same plane as the reference surface 16a, and the secondary reference surface 6a constitutes the luminous flux dividing means for dividing the luminous flux emitted from the light source 1 into two luminous fluxes.

That is, the linearly polarized luminous flux emitted from the light source 1 is transmitted through the polarization beam splitter 2 and the quarter wave plate 3, and is converted into circularly polarized light by the quarter wave plate 3 before reaching the mirror 5. After being reflected at the mirror 5, the circularly polarized luminous flux reaches the secondary reference surface 6a, and is divided into a first luminous flux of the circularly polarized light that is reflected at the secondary reference surface 6a, and a second luminous flux of the circularly polarized light that is transmitted through the secondary reference surface 6a.

The second luminous flux that is transmitted through the secondary reference surface 6a is transmitted through the light amount changing means 7 and reaches the secondary sample surface 8a, is reflected at the secondary sample surface 8a and returns along the same optical path, is transmitted through the light amount changing means 7 and reaches the secondary reference surface 6a, and is combined with the first luminous flux at the secondary reference surface 6a to form an irradiating luminous flux. Note that the point that here the position of the secondary sample surface 8a is set such that the optical path length difference between the two paths from the first and second luminous fluxes being divided at the secondary reference surface 6a up to being recombined at the secondary reference surface 6a is twice the optical path length between the reference surface 16a and the sample surface 17a, and also the paths traveled after the first and second luminous fluxes have been combined into the irradiating luminous flux, and so on are as with the apparatuses of the first and second embodiments described earlier.

According to the apparatus of the third embodiment, as with the apparatus of the first embodiment described earlier, even if the reference surface 16a and the sample surface 17a each move in the direction of the optical axis with no relationship therebetween through the influence of vibration or the like, no optical path length difference between the two paths that contribute to interference (i.e. between the path of, out of the previously mentioned first luminous flux, the luminous flux that is transmitted through the reference surface 16a and reaches the sample surface 17a of the sample 17, and is then reflected at the sample surface 17a, and the path of, out of the previously mentioned second luminous flux, the luminous flux that is reflected at the reference surface 16a) will arise, and no phase difference will arise between the two interfering luminous fluxes. Changes in the interference fringes will thus not arise, and hence precise interferometry is possible. Moreover, by driving the piezoelectric element 9 supporting the secondary sample 8, and hence minutely displacing the position of the secondary sample surface 8a in the up/down direction in the diagram, fringe scanning measurement or the like can also be carried out.

Moreover, because the secondary reference surface 6a faces in the same direction as the reference surface 16a, and is positioned substantially in the same plane as the reference surface 16a, it is easy to manufacture the holder that supports the reference surface 16a and the secondary reference surface 6a integrally with one another. In particular, by setting reflectance/transmittance for the secondary reference surface 6a appropriately, the light amount changing means 7 interposed between the secondary reference surface 6a and the secondary sample surface 8a can be omitted, whereby the secondary sample surface 8a can also be placed in the same plane as the sample surface 17a.

Fourth Embodiment

Figure 4:
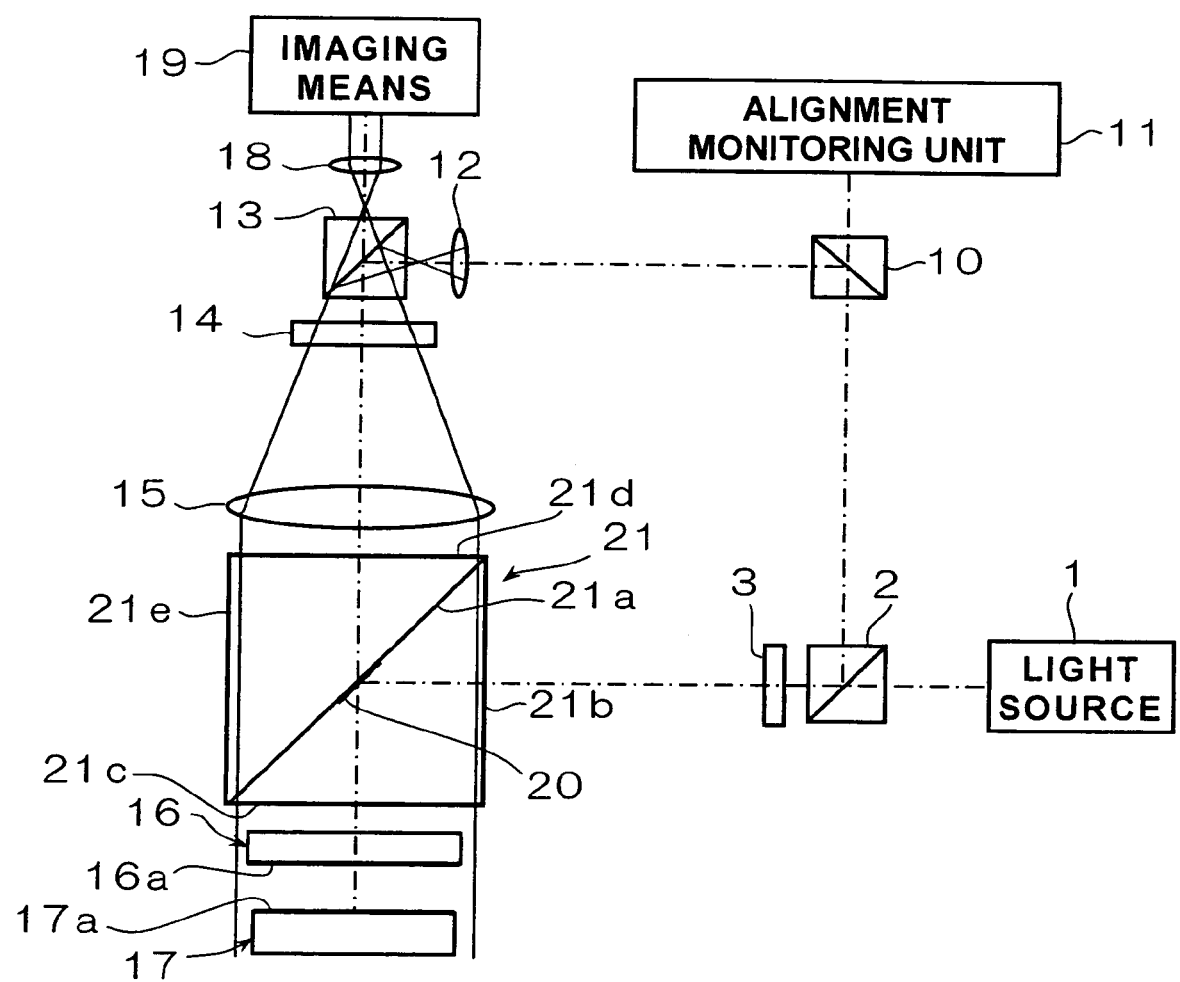
FIG. 4 is a schematic optical path diagram of a vibration-resistant interferometer apparatus according to a fourth embodiment of the present invention.

Next, a vibration-resistant interferometer apparatus according to a fourth embodiment of the present invention (hereinafter sometimes referred to as the 'apparatus of the fourth embodiment') will be described with reference to the drawings. FIG. 4 is a schematic optical path diagram of the vibration-resistant interferometer apparatus according to the fourth embodiment of the present invention.

The apparatus of the fourth embodiment shown in FIG. 4 differs to the apparatus of the first embodiment described earlier in that a secondary reference surface and a secondary sample surface are not provided, in that the reference surface 16a constitutes the luminous flux dividing means for dividing the luminous flux emitted from the light source 1 into two luminous fluxes, and in that a highly reflective surface (reflecting surface) 20 that reflects the luminous flux emitted from the light source 1 is disposed on the side of the reference surface 16a from which the irradiating luminous flux is incident, and the apparatus is constituted such that the luminous flux incident on the highly reflective surface 20 is irradiated substantially perpendicularly onto the reference surface 16a and the sample surface 17a, the luminous flux reflected at the reference surface 16a is taken as a first luminous flux, and the luminous flux reflected at the sample surface 17a after being transmitted through the reference surface 16a is taken as a second luminous flux, and these first and second luminous fluxes are combined at the reference surface 16a to form the irradiating luminous flux.

That is, the linearly polarized luminous flux emitted from the light source 1 is transmitted through the polarization beam splitter 2 and the quarter wave plate 3, and is converted into circularly polarized light by the quarter wave plate 3 before being made to be incident on a prism cube 21. The highly reflective surface 20 is provided approximately in a central portion of a joining surface 21a of the prism cube 21, and the circularly polarized luminous flux reflected at the highly reflective surface 20 after being incident on the prism cube 21 reaches the reference surface 16a, and is divided into a first luminous flux of the circularly polarized light that is reflected at the reference surface 16a and a second luminous flux of the circularly polarized light that is transmitted through the reference surface 16a.

The second luminous flux that is transmitted through the reference surface 16a reaches the sample surface 17a, is reflected at the sample surface 17a and returns along the same optical path, reaches the reference surface 16a, and is combined with the first luminous flux at the reference surface 16a to form the irradiating luminous flux. The combined circularly polarized irradiating luminous flux is reflected at the highly reflective surface 20, is converted at the quarter wave plate 3 into linearly polarized light having an oscillation plane orthogonal to that when emitted from the light source 1, and is reflected by the polarization beam splitter 2 and is incident on the half mirror 10. The linearly polarized light incident on the half mirror 10 is divided at the half-mirrored surface of the half mirror 10 into light that is transmitted through the half mirror 10 and is incident on the alignment monitoring unit 11, and light that is reflected through 90° at the half mirror 10 and is incident on the magnifying lens 12.

The linearly polarized light that has been transmitted through the half mirror 10 and reached the alignment monitoring unit 11 is used for combining the first luminous flux reflected at the reference surface 16a and the second luminous flux reflected at the sample surface 17a in a state in which the axes of the first and second luminous fluxes precisely coincide with one another. On the other hand, the linearly polarized light reflected at the half mirror 10 is diverged by the magnifying lens 12 and reaches the polarization beam splitter 13, is reflected at the polarization beam splitter 13 and is incident on the quarter wave plate 14, is converted into a circularly polarized luminous flux by the quarter wave plate 14 and reaches the collimator lens 15, and is made into parallel light by the collimator lens 15.

The circularly polarized luminous flux that has been made into parallel light is transmitted through the prism cube 21 and is incident on the reference plate 16, and part thereof is reflected at the reference surface 16a, and the remainder is transmitted through the reference surface 16a and reaches the sample surface 17a of the sample 17, and is reflected at the sample surface 17a before returning along the same path, being transmitted through the reference surface 16a, and being combined with the light that is reflected at the reference surface 16a.

The combined circularly polarized light is incident on the quarter wave plate 14 while being condensed by the collimator lens 15, and is converted into linearly polarized light having an oscillation plane orthogonal to that when incident on the quarter wave plate 14 while being diverged by the magnifying lens 12. This linearly polarized light is transmitted through the polarization beam splitter 13, and an image of the sample surface 17a is formed on the imaging element of the imaging means 19 by the photographic lens 18. Note that it is preferable to give each of the entrance/exit surfaces 21b, 21c and 21d of the prism cube 21 an anti-reflection coating, and blacken the ground surface for the remaining surface 21e.

According to the apparatus of the fourth embodiment, as with the apparatus of the first embodiment described earlier, even if the reference surface 16a and the sample surface 17a each move in the direction of the optical axis with no relationship therebetween through the influence of vibration or the like, no optical path length difference between the two paths that contribute to interference (i.e. between the path of, out of the previously mentioned first luminous flux, the luminous flux that is transmitted through the reference surface 16a and reaches the sample surface 17a of the sample 17, and is then reflected at the sample surface 17a, and the path of, out of the previously mentioned second luminous flux, the luminous flux that is reflected at the reference surface 16a) will arise, and no phase difference will arise between the two interfering luminous fluxes. Changes in the interference fringes will thus not arise, and hence precise interferometry is possible.

Moreover, according to the apparatus of the fourth embodiment, because a secondary reference surface and a secondary sample surface are not provided, there is no need to provide holding apparatuses such as holders for holding the secondary reference surface and the secondary sample surface integrally with the reference surface and the sample surface respectively. Moreover, because the reference surface 16a constitutes the luminous flux dividing means for dividing the luminous flux emitted from the light source 1 into two luminous fluxes, it becomes easy to make the optical path lengths of the two paths that contribute to interference precisely match one another.

Note, however, that for the imaging means 19, the highly reflective surface 20 is an obstacle, and hence there is a region of the sample surface 17a for which observation is not possible. By disposing the highly reflective surface 20 in another position away from the central portion of the joining surface 21a, this region for which observation is not possible can be eliminated. That is, if, for example, the highly reflective surface 20 is provided in a place such that the luminous flux reflected at the highly reflective surface 20 is transmitted through the reference surface 16a at a position close to the edge of the reference surface 16a, and moreover the reference surface 16a is made larger than the sample surface 17a, and it is made to be such that the luminous flux from the highly reflective surface 20 reaches a place outside of the sample surface 17a and a secondary sample surface is placed here, then measurement can be carried out without a region for which observation is not possible being created.

Fifth Embodiment

Figure 5:
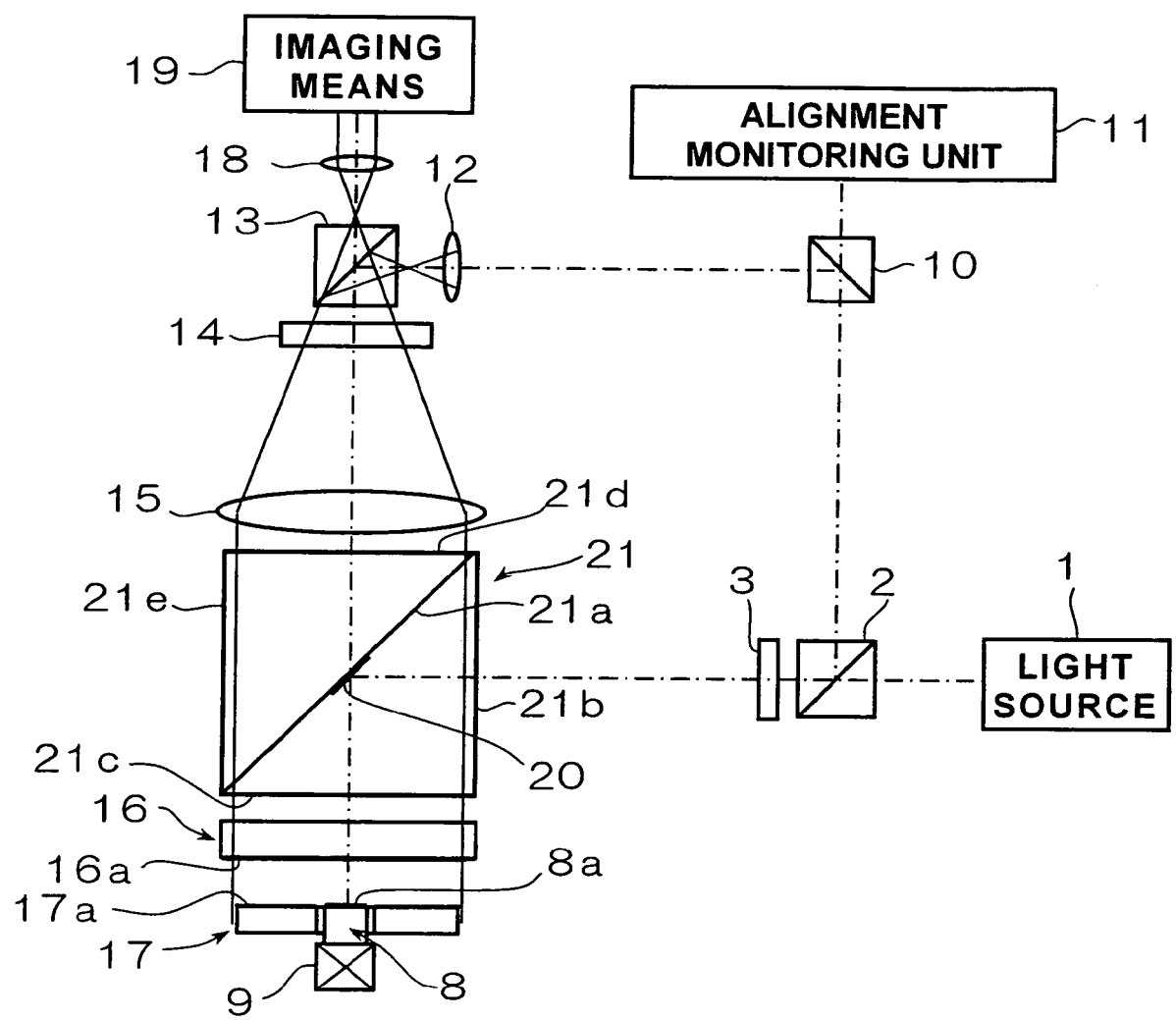
FIG. 5 is a schematic optical path diagram of a vibration-resistant interferometer apparatus according to a fifth embodiment of the present invention.

Next, a vibration-resistant interferometer apparatus according to a fifth embodiment of the present invention (hereinafter sometimes referred to as the 'apparatus of the fifth embodiment') will be described with reference to the drawings. FIG. 5 is a schematic optical path diagram of the vibration-resistant interferometer apparatus according to the fifth embodiment of the present invention.

The apparatus of the fifth embodiment shown in FIG. 5 differs to the apparatus of the fourth embodiment described earlier in that the apparatus is for measuring the form of the sample surface 17a of a sample 17 having a hole in a central portion thereof such as an optical disk, and a secondary sample 8 supported on a piezoelectric element 9 is disposed inside the hole in the sample 17. The constitution is such that the secondary sample surface 8a of the secondary sample 8 can be minutely displaced in the up/down direction in the diagram by the piezoelectric element 9, and in the state that the piezoelectric element 9 is not driven, the secondary sample surface 8a is positioned substantially in the same plane as the sample surface 17a.

With this apparatus of the fifth embodiment, the linearly polarized luminous flux emitted from the light source 1 is transmitted through the polarization beam splitter 2 and the quarter wave plate 3, and is converted into circularly polarized light by the quarter wave plate 3 before being made to be incident on the prism cube 21. The circularly polarized luminous flux incident on the prism cube 21 is reflected at the highly reflective surface 20 and reaches the reference surface 16a, and is divided into a first luminous flux of the circularly polarized light that is reflected at the reference surface 16a and a second luminous flux of the circularly polarized light that is transmitted through the reference surface 16a.

The second luminous flux that is transmitted through the reference surface 16a reaches the secondary sample surface 8a, is reflected at the secondary sample surface 8a and returns along the same optical path, reaches the reference surface 16a, and is combined with the first luminous flux at the reference surface 16a to form an irradiating luminous flux. The paths traveled after the first and second luminous fluxes have been combined into the irradiating luminous flux and so on are as with the apparatus of the fourth embodiment described earlier.

According to the apparatus of the fifth embodiment, as with the apparatus of the first embodiment described earlier, even if the reference surface 16a and the sample surface 17a each move in the direction of the optical axis with no relationship therebetween through the influence of vibration or the like, no optical path length difference between the two paths that contribute to interference (i.e. between the path of, out of the previously mentioned first luminous flux, the luminous flux that is transmitted through the reference surface 16a and reaches the secondary sample surface 8a, and is then reflected at the secondary sample surface 8a, and the path of, out of the previously mentioned second luminous flux, the luminous flux that is reflected at the reference surface 16a) will arise, and no phase difference will arise between the two interfering luminous fluxes. Changes in the interference fringes will thus not arise, and hence precise interferometry is possible.

Moreover, by driving the piezoelectric element 9 supporting the secondary sample 8, and hence minutely displacing the position of the secondary sample surface 8a in the up/down direction in the diagram, fringe scanning measurement or the like can also be carried out. Moreover, according to the apparatus of the fifth embodiment, by adjusting the size of the highly reflective surface 20, it can be made such that the highly reflective surface 20 is not an obstacle for the imaging means 19, and hence there is no region for which observation is not possible on the sample surface 17a.

Sixth Embodiment

Figure 6:
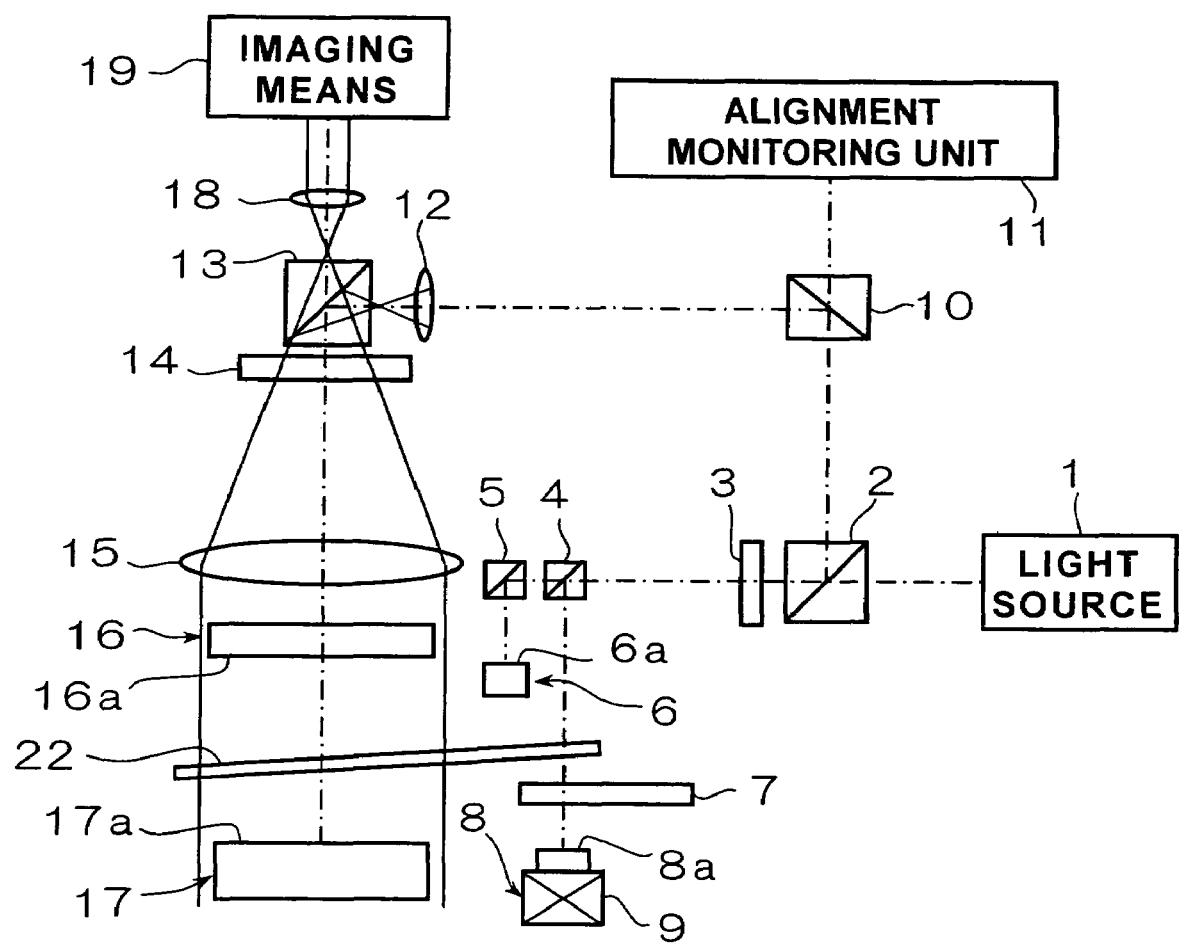
FIG. 6 is a schematic optical path diagram of a vibration-resistant interferometer apparatus according to a sixth embodiment of the present invention.

Next, a vibration-resistant interferometer apparatus according to a sixth embodiment of the present invention (hereinafter sometimes referred to as the 'apparatus of the sixth embodiment') will be described with reference to the drawings. FIG. 6 is a schematic optical path diagram of the vibration-resistant interferometer apparatus according to the sixth embodiment of the present invention.

The apparatus of the sixth embodiment shown in FIG. 6 is constituted such that the sample surface 17a is taken as a reference reflecting mirror surface, the irradiating luminous flux and a luminous flux obtained through reflection of the irradiating luminous flux from the sample surface 17a are transmitted through a light-transmitting sample transmitting object 22 such as a film disposed between the reference surface 16a and the sample surface 17a, and phase distribution measurement is carried out on the sample transmitting object 22. The point that the apparatus has a light source 1 that emits a luminous flux having a coherence length shorter than twice the optical distance between the reference surface 16a and the sample surface 17a, a half mirror 4 as luminous flux dividing means for dividing the luminous flux emitted from the light source 1 into two luminous fluxes, a secondary reference plate 6 that is held integrally with the reference plate 16, and a secondary sample 8 that is held integrally with the sample 17 is as with the apparatus of the first embodiment described earlier.

That is, the linearly polarized luminous flux emitted from the light source 1 is transmitted through the polarization beam splitter 2 and the quarter wave plate 3, and is converted into circularly polarized light by the quarter wave plate 3 before reaching the half mirror 4. A first luminous flux of the circularly polarized light transmitted through the half mirror 4 is reflected at the mirror 5 and reaches the secondary reference surface 6a, is reflected at the secondary reference surface 6a and returns along the same optical path, and is again reflected at the mirror 5 and transmitted through the half mirror 4.

On the other hand, a second luminous flux of the circularly polarized light that has been reflected at the half-mirrored surface upon reaching the half mirror 4 is transmitted through the sample transmitting object 22 and the light amount changing means 7 and reaches the secondary sample surface 8a, is reflected at the secondary sample surface 8a and returns along the same optical path, is transmitted through the light amount changing means 7 and the sample transmitting object 22 and reflected at the half-mirrored surface of the half mirror 4, and is combined with the first luminous flux to form the irradiating luminous flux. Note that here the position of the secondary sample surface 8a is set such that the optical path length difference between the two paths from being divided at the half mirror 4 up to being recombined at the half mirror 4 separately traveled by the first and second luminous fluxes is twice the optical path length between the reference surface 16a and the sample surface 17a (including the sample transmitting object 22).

The circularly polarized irradiating luminous flux obtained by combining the first and second luminous fluxes is converted at the quarter wave plate 3 into linearly polarized light having an oscillation plane orthogonal to that when emitted from the light source 1, and is reflected by the polarization beam splitter 2 and is incident on the half mirror 10. The linearly polarized light incident on the half mirror 10 is divided at the half-mirrored surface of the half mirror 10 into light that is transmitted through the half mirror 10 and is incident on the alignment monitoring unit 11, and light that is reflected through 90° at the half mirror 10 and is incident on the magnifying lens 12.

The linearly polarized light that has been transmitted through the half mirror 10 and reached the alignment monitoring unit 11 is used for combining the first luminous flux reflected at the secondary reference surface 6a and the second luminous flux reflected at the secondary sample surface 8a in a state in which the axes of the first and second luminous fluxes precisely coincide with one another. On the other hand, the linearly polarized light reflected at the half mirror 10 is diverged by the magnifying lens 12 and reaches the polarization beam splitter 13, is reflected at the polarization beam splitter 13 and is incident on the quarter wave plate 14, is converted into a circularly polarized luminous flux by the quarter wave plate 14 and reaches the collimator lens 15, and is made into parallel light by the collimator lens 15.

The circularly polarized luminous flux that has been made into parallel light is incident on the reference plate 16, and part thereof is reflected at the reference surface 16a, and the remainder is transmitted through the reference surface 16a and the sample transmitting object 22 and reaches the sample surface 17a, and is reflected at the sample surface 17a, before returning along the same path, being transmitted through the sample transmitting object 22 and the reference surface 16a, and being combined with the light that is reflected at the reference surface 16a.

The combined circularly polarized light is incident on the quarter wave plate 14 while being condensed by the collimator lens 15, and is converted into linearly polarized light having an oscillation plane orthogonal to that when incident on the quarter wave plate 14 while being diverged by the magnifying lens 12. This linearly polarized light is transmitted through the polarization beam splitter 13, and an image of interference fringes carrying phase distribution information for the sample transmitting object 22 is formed on the imaging element of the imaging means 19 by the photographic lens 18.

According to the apparatus of the sixth embodiment, as with the apparatus of the first embodiment described earlier, even if the reference surface 16a and the sample surface 17a each move in the direction of the optical axis with no relationship therebetween through the influence of vibration or the like, no optical path length difference which is unrelated to the phase distribution for the sample transmitting object 22 will arise between the two paths that contribute to interference (i.e. between the path of, out of the previously mentioned first luminous flux, the luminous flux that is transmitted through the reference surface 16a and the sample transmitting object 22 and reaches the sample surface 17a, and is then reflected at the sample surface 17a and transmitted through the sample transmitting object 22 and the reference surface 16a, and the path of, out of the previously mentioned second luminous flux, the luminous flux that is reflected at the reference surface 16a), and no phase difference which is unrelated to the phase distribution for the sample transmitting object 22 will arise between the two interfering luminous fluxes. Changes in the interference fringes due to vibration will thus not arise, and hence precise interferometry is possible.

Moreover, by driving the piezoelectric element 9 supporting the secondary sample 8, and hence minutely displacing the position of the secondary sample surface 8a in the up/down direction in the diagram, fringe scanning measurement or the like can also be carried out. Note that with the apparatus of the sixth embodiment, it is preferable to dispose the sample transmitting object 22 slightly inclined relative to the irradiating luminous flux, so that light reflected from the surface of the sample transmitting object 22 does not enter the imaging means. Moreover, due to putting the sample transmitting object 22 into the irradiating luminous flux, the optical path length between the reference surface 16a and the sample surface 17a is lengthened, but if it is made to be such that the sample transmitting object 22 also enters into the second luminous flux between the half mirror 4 and the secondary sample surface 8a, then there is no need to adjust the secondary reference surface or the secondary sample surface, and hence measurement can easily be carried out on a large film or the like.

Seventh Embodiment

Figure 7:
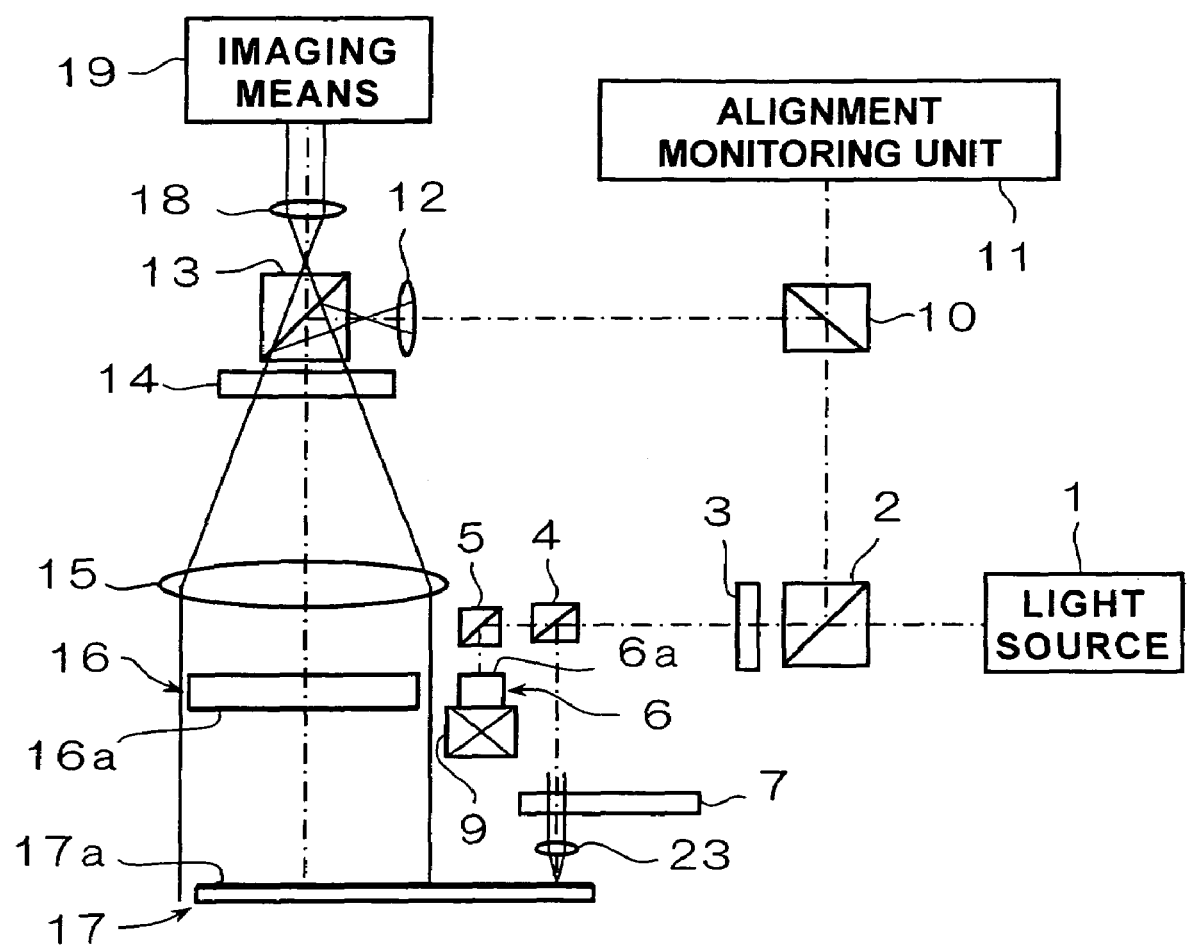
FIG. 7 is a schematic optical path diagram of a vibration-resistant interferometer apparatus according to a seventh embodiment of the present invention.
Figure 8:
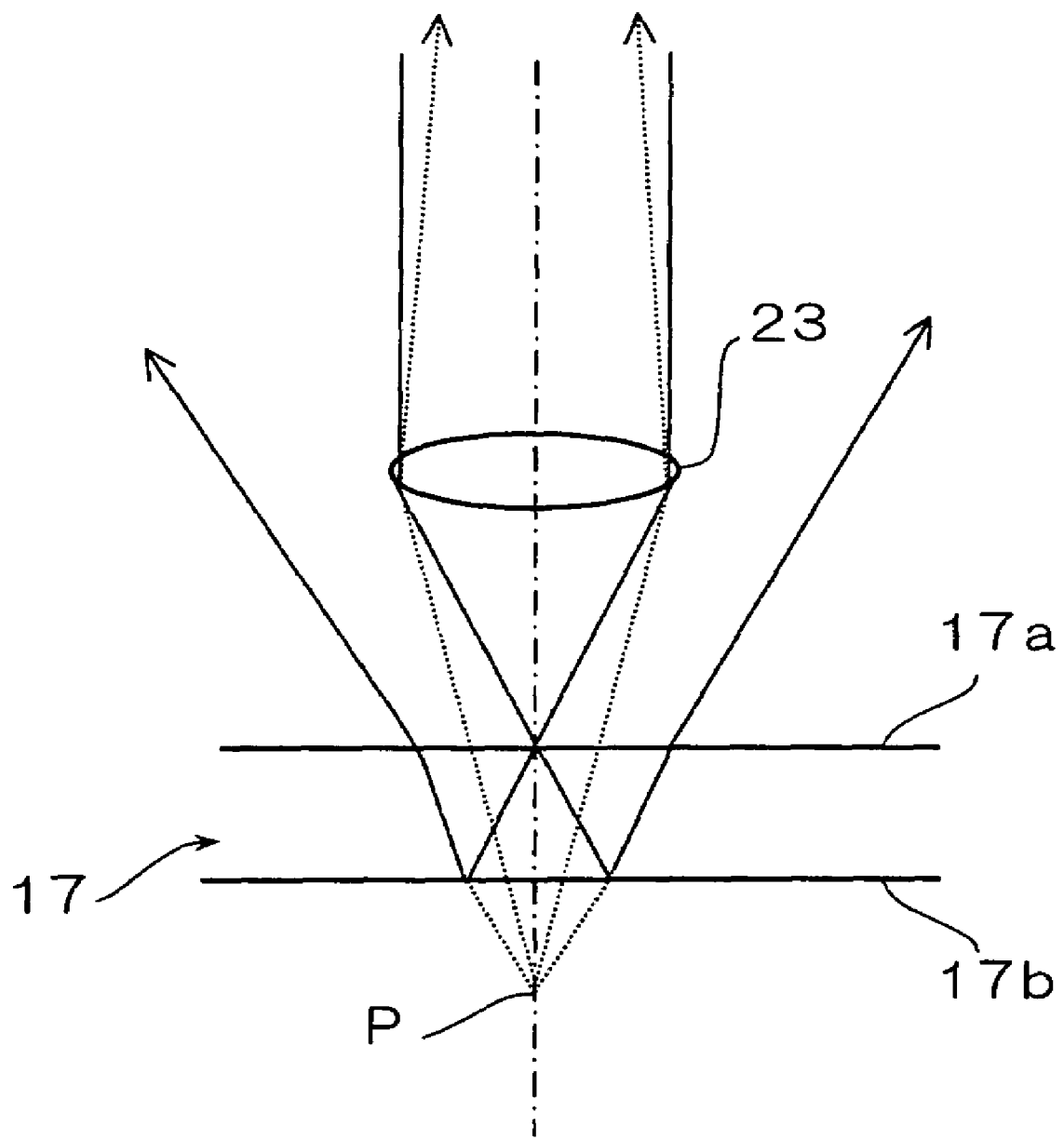
FIG. 8 is a diagram showing the action of a condensing lens shown in FIG. 7.

Next, a vibration-resistant interferometer apparatus according to a seventh embodiment of the present invention (hereinafter sometimes referred to as the 'apparatus of the seventh embodiment') will be described with reference to the drawings. FIG. 7 is a schematic optical path diagram of the vibration-resistant interferometer apparatus according to the seventh embodiment of the present invention, and FIG. 8 is a diagram showing the action of a condensing lens 23 shown in FIG. 7.

The apparatus of the seventh embodiment shown in FIG. 7 is for measuring the form of the sample surface 17a of a transparent thin sheet-like sample 17 such as a transparent glass sheet or film, and the coherence length of the luminous flux emitted from the light source 1 is set to be shorter than twice the optical distance of the thickness of the sample 17. The apparatus differs to the apparatuses of the other embodiments in that the apparatus has a secondary reference plate 6 having a secondary reference surface 6a, which is held on a piezoelectric element 9, but does not have a secondary sample surface 8a, and has a condensing lens 23 that condenses the second luminous flux obtained through the dividing by the half mirror 4 onto the sample surface 17a.

That is, the linearly polarized luminous flux emitted from the light source 1 is transmitted through the polarization beam splitter 2 and the quarter wave plate 3, and is converted into circularly polarized light by the quarter wave plate 3 before reaching the half mirror 4. A first luminous flux of the circularly polarized light transmitted through the half mirror 4 is reflected at the mirror 5 and reaches the secondary reference surface 6a, is reflected at the secondary reference surface 6a and returns along the same optical path, and is again reflected at the mirror 5 and transmitted through the half mirror 4.

On the other hand, a second luminous flux of the circularly polarized light that has been reflected at the half-mirrored surface upon reaching the half mirror 4 is transmitted through the light amount changing means 7 and is incident on the condensing lens 23. The condensing lens 23 is disposed such that the condensing point of the second luminous flux incident on the condensing lens 23 is positioned on the sample surface 17a. As shown in FIG. 8, part of the second luminous flux incident on the condensing lens 23 is reflected at the sample surface 17a and returns along the same optical path, is transmitted through the condensing lens 23 and the light amount changing means 7 and reflected at the half-mirrored surface of the half mirror 4, and is combined with the first luminous flux to form the irradiating luminous flux. Note that here the position of the secondary reference surface 6a is set such that the optical path length difference between the two paths from being divided at the half mirror 4 up to being recombined at the half mirror 4 separately traveled by the first and second luminous fluxes is twice the optical path length between the reference surface 16a and the sample surface 17a.

The circularly polarized irradiating luminous flux obtained by combining the first and second luminous fluxes is converted at the quarter wave plate 3 into linearly polarized light having an oscillation plane orthogonal to that when emitted from the light source 1, and is reflected by the polarization beam splitter 2 and is incident on the half mirror 10. The linearly polarized light incident on the half mirror 10 is divided at the half-mirrored surface of the half mirror 10 into light that is transmitted through the half mirror 10 and is incident on the alignment monitoring unit 11, and light that is reflected through 90° at the half mirror 10 and is incident on the magnifying lens 12.

The linearly polarized light that has been transmitted through the half mirror 10 and reached the alignment monitoring unit 11 is used for combining the first luminous flux reflected at the secondary reference surface 6a and the second luminous flux reflected at the sample surface 17a in a state in which the axes of the first and second luminous fluxes precisely coincide with one another. On the other hand, the linearly polarized light reflected at the half mirror 10 is diverged by the magnifying lens 12 and reaches the polarization beam splitter 13, is reflected at the polarization beam splitter 13 and is incident on the quarter wave plate 14, is converted into a circularly polarized luminous flux by the quarter wave plate 14 and reaches the collimator lens 15, and is made into parallel light by the collimator lens 15.

The circularly polarized luminous flux that has been made into parallel light is incident on the reference plate 16, and part thereof is reflected at the reference surface 16a, and the remainder is transmitted through the reference surface 16a and reaches the sample surface 17a, and is reflected at the sample surface 17a before returning along the same path, being transmitted through the reference surface 16a, and being combined with the light that is reflected at the reference surface 16a.

The combined circularly polarized light is incident on the quarter wave plate 14 while being condensed by the collimator lens 15, and is converted into linearly polarized light having an oscillation plane orthogonal to that when incident on the quarter wave plate 14 while being diverged by the magnifying lens 12. This linearly polarized light is transmitted through the polarization beam splitter 13, and an image of the sample surface 17a is formed on the imaging element of the imaging means 19 by the photographic lens 18.

According to the apparatus of the seventh embodiment, as with the apparatus of the first embodiment described earlier, even if the reference surface 16a and the sample surface 17a each move in the direction of the optical axis with no relationship therebetween through the influence of vibration or the like, no optical path length difference between the two paths that contribute to interference (i.e. between the path of, out of the previously mentioned first luminous flux, the luminous flux that is transmitted through the reference surface 16a and reaches the sample surface 17a, and is then reflected at the sample surface 17a, and the path of, out of the previously mentioned second luminous flux, the luminous flux that is reflected at the reference surface 16a) will arise, and no phase difference will arise between the two interfering luminous fluxes. Changes in the interference fringes will thus not arise, and hence precise interferometry is possible. Moreover, by driving the piezoelectric element 9 supporting the secondary reference plate 6, and hence minutely displacing the position of the secondary reference surface 6a in the up/down direction in the diagram, fringe scanning measurement or the like can also be carried out.

Moreover, according to the apparatus of the seventh embodiment, because the coherence length of the luminous flux emitted from the light source 1 is set to be shorter than twice the optical distance of the thickness of the sample 17, interference due to the luminous flux reflected from the sample surface 17a and the luminous flux reflected from a rear surface 17b of the sample 17 does not occur, and hence measurement of the form of the sample surface 17a can be carried out with high precision. Furthermore, according to the apparatus of the seventh embodiment, through having the condensing lens 23, the S/N ratio for the interference fringes formed can be improved. The action of the condensing lens 23 is as follows.

That is, as shown in FIG. 8, out of the second luminous flux incident on the sample 17 via the condensing lens 23, the part of the luminous flux reflected at the rear surface 17b of the sample 17 becomes just like a luminous flux emitted from a virtual point light source P positioned more distant than the focal point of the condensing lens 23; part of this luminous flux reaches a place within the effective diameter of the condensing lens 23, but the remainder does not return within the effective diameter of the condensing lens 23. Even for the luminous flux that returns within the effective diameter of the condensing lens 23, this luminous flux does not exit the condensing lens 23 in the same state (convergent or divergent) as the luminous flux that has returned from the condensing point on the sample surface 17a, but rather exits from the condensing lens 23 as a convergent luminous flux. This luminous flux goes through a focal point while traveling along the optical path, and subsequently becomes divergent light. The amount of this luminous flux that is superimposed on the luminous flux reflected from the sample surface 17a is thus very low. Because the amount of this unnecessary light can be reduced, the S/N ratio for the interference fringes formed can be improved.

Embodiments of the present invention have been described above, but the present invention is not limited to the above embodiments. For example, the luminous flux emitted from the light source in the apparatus of each of the above embodiments is made to be linearly polarized light having a prescribed oscillation plane, but a light source that emits a luminous flux that is not linearly polarized can also be used.

Moreover, in the apparatus of each of the above embodiments, the constitution is such that the optical path length difference between the two optical paths from being divided into the first and second luminous fluxes by the luminous flux dividing means up to the first and second luminous fluxes being recombined is substantially equal to twice the optical distance between the reference surface and the sample surface, but except in the case of measuring the surface form of a transparent thin sheet, the optical path length difference between the two optical paths may be set to coincide with approximately twice the optical distance between the reference surface and the sample surface within the range of the coherence length of the luminous flux emitted from the light source, in other words, the difference between the optical path length difference between the two optical paths and twice the optical distance between the reference surface and the sample surface is shorter than the maximum optical path difference for which the two luminous fluxes divided off from the light source can interfere with one another.

Moreover, the apparatus of each of the above embodiments is a Fizeau-type interferometer, but the present invention can also be applied to another interferometer apparatus such as an Abramson-type grazing incidence interferometer.

Due to having the constitution described above, according to the vibration-resistant interferometer apparatus of the present invention, even if the sample surface moves in the direction of the optical axis through vibration, changing of the optical path length difference between the two paths that contribute to interference can be suppressed optically, and hence it becomes possible to carry out precise interferometry that is not prone to being influenced by vibration; this is particularly effective for in-process measurement.

What is claimed is:

1. A vibration-resistant interferometer apparatus comprising:
    a light source emitting a luminous flux;
    a light divider configured to divide the luminous flux into two divided luminous fluxes;
    an optical detouring component configured to detour each of said two divided luminous fluxes into respective optical paths that have different optical path lengths relative to each other;
    an optical recombining component configured to recombine said two divided luminous fluxes into one luminous flux to form an irradiating luminous flux; and
    means for producing interference fringes through optical interference between a first luminous flux obtained by reflecting said irradiating luminous flux at a reference surface and a second luminous flux obtained by transmitting said irradiating luminous flux through said reference surface and then reflecting at a sample surface, and then recombining said first luminous flux and said second luminous flux such that the axis of said first luminous flux and the axis of said second luminous flux substantially coincide with one another, wherein
    said light source is a low-coherence light source for which said luminous flux, emitted from said light source, has a coherence length shorter than twice the optical distance between said reference surface and said sample surface, or a wavelength-modulated light source adjusted such that the coherence length is equivalent to the coherence length possessed by such a low-coherence light source when an image of said interference fringes is captured by an imaging element,
    said irradiating luminous flux is obtained by reflecting a first divided luminous flux out of said two divided luminous fluxes from a second reference surface that is held such that the relative positional relationship thereof with said reference surface does not change, and reflecting a second divided luminous flux out of said two divided luminous fluxes from a secondary sample surface that is held such that the relative positional relationship thereof with said sample surface does not change and faces in the same direction as said sample surface, and then recombining said first divided luminous flux and said second divided luminous flux via said optical recombining component into said one luminous flux such that the axis of said first divided luminous flux and the axis of said second divided luminous flux substantially coincide with one another, and
    a position of the secondary sample surface is set such that an optical path length difference between the optical path taken by said first divided luminous flux from the light divider to the secondary reference surface and back to the optical recombining component and the optical path taken by said second divided luminous flux from the light divider to the secondary sample surface and back to the optical recombining component is twice an optical path length between the reference surface and the sample surface.

2. The vibration-resistant interferometer apparatus according to claim 1, wherein said light divider is a beam splitter, one of said two divided luminous fluxes obtained through the dividing by said beam splitter is irradiated onto said secondary reference surface and the reflected luminous flux is taken as said first divided luminous flux, the other one of said two divided luminous fluxes is irradiated onto said secondary sample surface and the reflected luminous flux is taken as said second divided luminous flux, and said first divided luminous flux and said second divided luminous flux are recombined into said one luminous flux at said beam splitter to form said irradiating luminous flux.

3. The vibration-resistant interferometer apparatus according to claim 1, wherein said secondary reference surface is disposed substantially in the same plane as said reference surface, and/or said secondary sample surface is disposed substantially in the same plane as said sample surface.

4. The vibration-resistant interferometer apparatus according to claim 1, wherein said secondary reference surface and/or said secondary sample surface has optical path length adjustment means for moving said secondary reference surface and/or said secondary sample surface in a direction along the axis of the incident luminous flux, and optical axis adjustment means for adjusting the inclination of the axis of the reflected luminous flux relative to the axis of the incident luminous flux.

5. The vibration-resistant interferometer apparatus according to claim 1, wherein said secondary reference surface or said secondary sample surface include a piezoelectric element.

6. The vibration-resistant interferometer apparatus according to claim 1, further having means for changing light amount for at least one of said two luminous fluxes.

7. The vibration-resistant interferometer apparatus according to claim 1, wherein said luminous flux emitted from said light source is linearly polarized light having a prescribed oscillation plane, or is made to be linearly polarized light having a prescribed oscillation plane by being transmitted through a prescribed polarizing element.

8. The vibration-resistant interferometer apparatus according to claim 1, wherein a sample having said sample surface is a transparent thin sheet, and said coherence length of said luminous flux emitted from said light source is set to be shorter than twice the optical distance of the thickness of said transparent thin sheet.

9. The vibration-resistant interferometer apparatus according to claim 8, wherein said transparent thin sheet is a film.

10. The vibration-resistant interferometer apparatus according to claim 1, wherein said sample surface is a reference reflecting mirror surface, a light-transmitting sample transmitting object is disposed between said reference surface and said reference reflecting mirror surface, said irradiating luminous flux and a luminous flux obtained through reflection of said irradiating luminous flux by said reference reflecting mirror surface are transmitted through said sample transmitting object and phase distribution measurement is carried out on said sample transmitting object.

11. The vibration-resistant interferometer apparatus according to claim 1, wherein a condensing lens is disposed in said second luminous flux, and the condensing point of said second luminous flux by said condensing lens is positioned on said sample surface.

12. The vibration-resistant interferometer apparatus according to claim 1, wherein said low-coherence light source is a light emitting diode, a super luminescent diode, or a halogen lamp.

13. A vibration-resistant interferometer apparatus comprising:
a light source emitting a luminous flux;
a light divider configured to divide the luminous flux into two divided luminous flues;
an optical detouring component configured to detour one of said two divided luminous fluxes by a prescribed optical path length relative to the other one;
an optical recombining component configured to recombine said two divided luminous fluxes into one luminous flux to form an irradiating luminous flux; and
means for producing interference fringes through optical interference between a first luminous flux obtained by reflecting said irradiating luminous flux at a reference surface and a second luminous flux obtained by transmitting said irradiating luminous flux through said reference surface and then reflecting at a sample surface, and then recombining said first luminous flux and said second luminous flux such that the axis of said first luminous flux and the axis of said second luminous flux substantially coincide with one another, wherein
said light source is a low-coherence light source for which said luminous flux, emitted from said light source, has a coherence length shorter than twice the optical distance between said reference surface and said sample surface, or a wavelength-modulated light source adjusted such that the coherence length is equivalent to the coherence length possessed by such a low-coherence light source when an image of said interference fringes is captured by an imaging element,
a secondary reference surface that is held such that the relative positional relationship thereof with said reference surface does not change is said light divider and said optical recombining component,
the luminous flux from the light source and reflected at said secondary reference surface is taken as a first divided luminous flux,
the luminous flux from the light source that is transmitted through said secondary reference surface, reflected at a secondary sample surface that is held such that the relative positional relationship thereof with said sample surface does not change and faces in the same direction as said sample surface, and then transmitted through said secondary reference surface is taken as a second divided luminous flux, and
said first divided luminous flux and said second divided luminous flux are recombined into said one luminous flux at said secondary reference surface such that an axis of said first divided luminous flux and an axis of said second divided luminous flux substantially coincide with one another to form said irradiating luminous flux.

14. The vibration-resistant interferometer apparatus according to claim 13, wherein said prescribed optical path length substantially equals twice said optical distance between said reference surface and said sample surface.

15. A vibration-resistant interferometer apparatus according comprising:
a light source emitting a luminous flux;
a light divider configured to divide the luminous flux into two divided luminous fluxes;
an optical detouring component configured to detour one of said two divided luminous fluxes by a prescribed optical path length relative to the other one;
an optical recombining component configured to recombine said two divided luminous fluxes into one luminous flux to form an irradiating luminous flux; and
means for producing interference fringes through optical interference between a first luminous flux obtained by reflecting said irradiating luminous flux at a reference surface and a second luminous flux obtained by transmitting said irradiating luminous flux through said reference surface and then reflecting at a sample surface, and then recombining said first luminous flux and said second luminous flux such that the axis of said first luminous flux and the axis of said second luminous flux substantially coincide with one another, wherein
said light source is a low-coherence light source for which said luminous flux emitted from said light source, has a coherence length shorter than twice the optical distance between said reference surface and said sample surface or a wavelength-modulated light source adjusted such that the coherence length is equivalent to the coherence length possessed by such a low-coherence light source when an image of said interference fringes is captured by an imaging element,
said irradiating luminous flux is obtained by reflecting a first divided luminous flux out of said two divided luminous fluxes from a secondary reference surface that is held such that the relative positional relationship thereof with said reference surface does not change, and reflecting a second divided luminous flux out of said two divided luminous fluxes from a secondary sample surface that is held such that the relative positional relationship thereof with said sample surface does not change and faces in the same direction as said sample surface, and then recombining said first divided luminous flux and said second divided luminous flux via said optical recombining component into said one luminous flux such that the axis of said first divided luminous flux and the axis of said second divided luminous flux substantially coincide with one another,
said prescribed optical path length coincides with approximately twice the optical distance between said reference surface and said sample surface within the range of said coherence length of said luminous flux emitted from said light source,
said secondary reference surface is disposed substantially in the same plane as said reference surface, and/or said secondary sample surface is disposed substantially in the same plane as said sample surface, and
a hole is formed in a central portion of said sample surface, and said secondary sample surface is disposed inside said hole.

16. A vibration-resistant interferometer apparatus comprising:
a light source emitting a luminous flux;
a light divider configured to divide the luminous flux into two divided luminous fluxes;
an optical detouring component configured to detour one of the divided luminous fluxes by a prescribed optical path length relative to the other one;
an optical recombining component configured to recombine said two divided luminous fluxes into one luminous flux to form an irradiating luminous flux; and
means for producing interference fringes through optical interference between a first luminous flux obtained by reflecting said irradiating luminous flux at a reference surface and a second luminous flux obtained by transmitting said irradiating luminous flux through said reference surface and then reflecting at a sample surface, and then recombining said first luminous flux and said second luminous flux such that the axis of said first luminous flux and the axis of said second luminous flux substantially coincide with one another, wherein said light source is a low-coherence light source for which said luminous flux, emitted from said light source, has a coherence length shorter than twice the optical distance between said reference surface and said sample surface, or a wavelength-modulated fight source adjusted such that the coherence length is equivalent to the coherence length possessed by such a low-coherence light source when an image of said interference fringes is captured by an imaging element, said light divider is said reference surface, and a luminous flux reflected at said reference surface is taken as a first divided luminous flux, a luminous flux transmitted through said reference surface, reflected at said sample surface, and then transmitted through said reference surface is taken as a second divided luminous flux, and said first divided luminous flux and said second divided luminous flux are recombined at said reference surface such that the axis of said first luminous flux and the axis of said second luminous flux substantially coincide with one another to form said irradiating luminous flux.

* * * * *